United States Patent [19]

Lustig et al.

[11] 4,196,240

[45] Apr. 1, 1980

[54] HEAT SHRINKABLE MULTILAYER PACKAGING FILM OF BLENDED COPOLYMERS AND ELASTOMERS

[75] Inventors: Stanley Lustig, Park Forest; Stephen J. Vicik, Darien; William J. Kohler, Westmont, all of Ill.

[73] Assignee: Union Carbide Corporation, New York, N.Y.

[21] Appl. No.: 870,598

[22] Filed: Jan. 18, 1978

[51] Int. Cl.$^2$ .................... B65D 33/00; B65D 33/04; B32B 27/08
[52] U.S. Cl. ..................................... 428/35; 428/218; 428/516; 428/520; 428/910; 206/819; 426/392; 426/410; 229/53
[58] Field of Search ................. 428/35, 516, 520, 910, 428/218

[56] References Cited

U.S. PATENT DOCUMENTS

| | | | |
|---|---|---|---|
| 3,634,552 | 1/1972 | Foglia et al. | 260/897 A |
| 3,634,553 | 1/1972 | Foglia et al. | 260/897 A |
| 3,900,635 | 8/1975 | Funderburk et al. | 428/516 X |
| 4,078,020 | 3/1978 | Rose et al. | 260/897 A |
| 4,082,877 | 4/1978 | Shadle | 428/35 |

FOREIGN PATENT DOCUMENTS 1508033  4/1978  United Kingdom .

*Primary Examiner*—P. C. Ives
*Attorney, Agent, or Firm*—David Fink

[57] ABSTRACT

A heat-shrinkable multilayer film suitable for use in the packaging of a frozen poultry, includes a first outer layer comprising a blend of propylene-ethylene copolymer having a high isotactic molecular structure with less than about 6% by weight being ethylene and having a melt flow of from about 1.5 to about 18 decigrams per minute; a (butene-1)-ethylene copolymer having a high isotactic molecular structure with less than about 10% by weight ethylene and having a melt flow of from about 0.1 to about 5.0 decigrams per minute, and a thermoplastic elastomer selected from the group consisting of ethylene-propylene copolymers and ethylene-propylene diene terpolymers, the ratio by weight of the propylene-ethylene copolymer to the (butene-1)-ethylene copolymer being from about 2:1 to about 1:2 and the thermoplastic elastomer being present from about 10% to about 50% by weight, and a second outer layer comprising an ethylene-(butene-1) copolymer having a melt flow of from about 0.1 to about 1.0 decigram per minute, having a density of from about 0.916 to about 0.920 gram per cubic centimeter, and being a linear polymer; the multilayer film being biaxially oriented.

22 Claims, No Drawings

HEAT SHRINKABLE MULTILAYER PACKAGING FILM OF BLENDED COPOLYMERS AND ELASTOMERS

The present invention relates to a heat-shrinkable multilayer film, and more particularly to a multilayer film suitable for use in the packaging of a frozen poultry. In addition, the invention relates to a bag fabricated from the multilayer film.

The invention also relates to a polymer resin mixture, and films and bags produced from the polymer resin mixtures for use in connection with the packaging of poultry.

Generally, the packaging operation presently being commercially used to package frozen poultry necessitates that the packaging materials exhibit special properties. The typical packaging operation includes the following steps:

1. dropping the bird into a bag fabricated from a shrinkable film;
2. clamping the neck of the bag;
3. transporting the bird with the entire weight thereof being supported by the neck of the bag;
4. subjecting the bag to a temperature from about 90° C. to about 95° C. for a period of time up to about 7 seconds to shrink the bag tightly around the bird;
5. quick freezing and then storing the packaged bird at temperatures as low as about −40° C.; and
6. transporting the packaged bird and thereby possibly result in the continuous abrasion and impact between packaged birds.

The packaging operation requires the shrinkable film to possess the following general properties:
1. Sufficient tensile strength to support the weight of the bird;
2. Puncture resistance especially during the shrinkage of the film around the bagged bird.
3. Sufficient shrink force at a temperature from about 90° C. to about 95° C., for example, to pull the wings of a bird tightly towards the body and sufficient residual shrink force to maintain a tight wrap around the bird;
4. Sufficient strength for a heat seal so that after the film has been fabricated into a bag by a conventional heat sealing operation, there will be no seal failure during a subsequent shrink packaging operation at a temperature from about 90° C. to about 95° C.; and
5. Sufficient impact strength and abrasion resistance at about −40° C. to protect the bird during freezing, shipping, and consumer handling.

In addition to the above enumerated general requirements, the film must possess dimensional stability and non-tacky surfaces, and should have processing characteristics which enable thickness control and high production efficiency at reasonable manufacturing speeds.

In the prior art, several film materials have been either used or proposed for packaging frozen poultry. For example, the U.S. Pat. No. 3,555,604 to Pahlke discloses a process for producing bioriented low density polyethylene in the form of a shrinkable thermoplastic film. In this process, a tubing of the polyethylene material defines an isolated bubble maintained by simple nip rollers and the bubble is subjected to heat and radial expansion by internal pressure near the draw point of the tubing, that is, the point at which the polyethylene material is at or just below its softening point. This process is generally referred to as the "double bubble" method.

The biaxial orienting of low density polyethylene can also be carried out by using an irradiated film and stretching it by methods well known in the art to obtain a film having satisfactory melt strength and shrinkage values at a temperature of about 90° C. The film, however, is relatively expensive and has marginal heat sealing properties because of the loss of thermoplastic characteristics due to induced cross linking of the polymer chains from the irradiation. This also inhibits the reprocessing of waste film. The U.S. Pat. No. 3,365,520 to Foster et al describes the xylene solubility test for distinguishing between irradiated and non-irradiated polyethylene.

The aforementioned U.S. Pat. No. 3,365,520 also discloses a blend of an ionomer and an ethylene homopolymer or copolymer for producing a bioriented film having exceptional shrinkage and shrink force at a temperature of about 90° C. and having good processing characteristics. The film has very poor heat sealing properties for use in packaging poultry. While heat sealing strength at room temperature is adequate, the strength at about 95° C. is extremely low.

The U.S. Pat. No. 3,900,635 to Funderburk et al discloses a multilayer film including a blend of an ionomer and ethylene homopolymers or copolymers, and another layer of ethylene homopolymers or copolymers. The film exhibits adequate shrinkage at about 90° C. and good seal strength. The film, however, does not possess some other important properties such as abrasion resistance much better than a bioriented low density polyethylene single layer film.

The U.S. Pat. No. 3,754,063 to Schirmer relates to a laminated, tubular, thermoplastic film produced by continuously extruding a layer of an ethylene vinyl acetate copolymer onto a tubular substrate of a predominantly ethylene polymer material and continuously extruding an admixed isotactic polypropylene, polybutene-1 and atactic polypropylene polymer layer as the outer layer thereon and then orienting the laminate.

The U.S. Pat. No. 3,891,008 to D'Entremont is an improved film with respect to the aforementioned U.S. Pat. No. 3,754,063 and teaches a multilayer film including a substrate layer of an oriented thermoplastic material in combination with a layer comprising a copolymer of ethylene and propylene, preferably from 60% to 95% by weight and polybutene-1, preferably 5% to 40% by weight.

The U.S. Pat. No. 3,634,553 relates to a heat shrinkable film comprising a blend of from about 10% to about 90% by weight of a high isotactic content propylene resin having a melt flow at 230° C. of from about 0.1 to about 5.0 decigrams per minute, and from about 10% to about 90% by weight of an ethylene-butene-1 copolymer resin containing less than about 10% by weight ethylene. The U.S. Pat. No. 3,634,552 is closely related to the aforementioned U.S. Pat. No. 3,634,553 and is directed to the resinous blend composition.

Although each of the known films meet many of the requirements for packaging applications such as the packaging of frozen poultry, the need still exists for improved heat shrinkable films.

The invention relates to a heat-shrinkable multilayer film suitable for use in the packaging of frozen poultry, including a first outer layer comprising a blend of a propylene-ethylene copolymer having a high isotactic molecular structure, containing up to about 6% by weight ethylene, and having a melt flow of from about 1.5 to about 18 decigrams per minute; a (butene-1)-ethylene copolymer having a high isotactic molecular structure, containing from about 1% to about 10% by weight ethylene, and having a melt flow of from about 0.1 to about 5.0 decigrams per minute; and a thermoplastic elastomer selected from the group consisting of ethylene-propylene copolymers and ethylene propylene diene terpolymers, the ratio by weight of the propylene-ethylene copolymer to the (butene-1)-ethylene copolymer being from about 2:1 to about 1:2 and the thermoplastic elastomer being present from about 10% by weight to about 50% by weight; and a second outer layer comprising an ethylene-(butene-1) copolymer having a melt flow of from about 0.1 to about 1.0 decigrams per minute, having a density of from about 0.916 to about 0.920 gram per cubic centimeter; the film being biaxially oriented.

Preferably, the film further includes at least one core layer capable of being biaxially oriented and heat shrinkable and comprising an extrudable adhesive.

Generally, the propylene-ethylene copolymer for the invention can be prepared by a stereo-specific catalytic polymerization process which generally yields isotactic molecular structures containing up to about 6% by weight ethylene monomer copolymerized with propylene. Preferably, the propylene-ethylene copolymer should be a film grade resin having a density of from about 0.89 to about 0.91 grams per cubic centimeters. Preferably, the melt flow is from about 3.5 to about 12.0 dicigrams per minute. Preferably, the ethylene content should be at least about 2% by weight and more preferably about 4% by weight.

Generally, the (butene-1)-ethylene copolymers suitable for the invention may be produced by copolymerizing butene-1 ethylene in the presence of stereo-specific polymerization catalysts such as disclosed in the U.S. Pat. No. 3,629,940 and described in the aforementioned U.S. Pat. No. 3,634,552. The (butene-1)-ethylene copolymers for the invention are further characterized by a methylene absorption value of from about 0.001 to about 0.04 absorbance units per unit at a wave number of 720, and a DTA thermal peak value of at least 80° C. and in the range of 80° C. to 130° C. As used herein, DTA designates differential thermal analysis carried out by heating at a rate of rise of 5° C. per minute. Preferably, the (butene-1)-ethylene copolymer contains about 3% to about 6% by weight of ethylene.

While the weight ratio in the first outer layer for the propylene-ethylene copolymer to the (butene-1)-ethylene copolymer from about 2:1 to about 1:2, a weight ratio of about 1:1 is preferable.

Generally, the ethylene-propylene copolymer elastomer for the invention includes at least about 50% by weight ethylene, preferably 70% by weight, and has a Mooney viscosity at 260° F. (ML 1+8 minutes) of from about 23 to about 50 centipoises.

The thermoplastic elastomer can also be an ethylene-propylene diene modified terpolymer. One commercially available ethylene terpolymer suitable for the invention but not food approved includes the E. I duPont de Nemours & Co. product sold under the tradename Nordel 1500. The Nordel 1500 is a terpolymer of ethylene, propylene and 1, 4 hexadiene having a specific density of about 0.85 and Mooney viscosity at 250° F. (ML 2+10) of about 58±6 centipoises.

The thermoplastic elastomer in the first outer layer imparts a surprising improvement in the shrink properties of the film for temperatures less than about 100° C. The amount of the thermoplastic elastomer can be as high as about 50% by weight or even greater but the tackiness of the blend may be unacceptable at the higher levels. Preferably, the amount should be from about 20% to about 40% by weight.

Generally, the core layer should be capable of being bioriented by the "double bubble" method of the aforementioned U.S. Pat. No. 3,555,604 and should exhibit high shrinkage for temperatures less than about 100° C. An ionomer and/or an ethylene vinyl acetate copolymer are suitable materials. Ionomers are well-known in the art and are generally a copolymer of ethylene and an ethylenically unsaturated acid such as acrylic and methacrylic acid, wherein all or part of the acid has been neutralized to form a salt such as the zinc or the sodium salts. Suitable ionomers are disclosed in the U.S. Pat. No. 3,365,520 to Foster el al. Generally, the ethylene vinyl acetate copolymers have a melt flow of from about 0.1 to about 1.0 decigrams per minute and contain a vinyl acetate content of from about 9% to about 12% by weight.

The ethylene-(butene-1) copolymer suitable for the second layer is a linear polymer and can typically be prepared by the process disclosed in the U.S. Pat. No. 4,011,382 to Levine et al. Generally the suitable ethylene(butene-1) copolymer exhibits a flow rate ratio of from about 45 to about 100.

Preferably, the ethylene-(butene-1) copolymer has a melt flow of from about 0.3 to about 0.8 decigrams per minute and a density of from about 0.918 to 0.920 gram per cubic centimeter. A density greater than about 0.920 gram per cubic centimeter results in a film with less shrinkage than suitable in the intended poultry packaging.

It is advantageous to include an antioxidant with the ethylene-(butene-1) copolymer to inhibit crosslinking during the extrusion of the copolymer.

Generally, the use of antioxidants is known and relates to stability of properties both during extrusion and during shelf life and antioxidants are not considered to be an essential element in the film of the invention, but nevertheless are preferable in the commercial practice of the invention. Suitable antioxidants include sterically hindered phenols and amines and the like.

The use of the ethylene-(butene-1) copolymer in the second layer in direct contact with a bagged bird surprisingly provides high puncture resistance particularly during the shrinking of the film at an elevated temperature. During the shrink operation, it is possible for a bone to be pressed strongly against the film and to result in a puncture under the shrink operation conditions.

Generally, the thickness of the film is from about 2.0 mils to about 2.75 mils. A film having a thickness less than about 2.0 mils tends to be physically weak for use in the poultry packaging industry while a film having a thickness greater than about 2.75 mils tends to be difficult to biorient. The first outer layer can have a thickness of from about 35% to about 60% of the total film thickness. The second outer layer can have a thickness of from about 20% to about 50% of the film thickness. The core layer should not be greater than about 20% of the film thickness.

In general, various conventional additives such as slip agents, antiblocking agents, and pigments can be incorporated in the films in accordance with conventional practice.

The properties of the polymers described herein unless otherwise indicated have their properties determined according to the following test methods:

Density - ASTM D-1505
Melt flow - ASTM D-1238
    Propylene-ethylene copolymer -
        Condition L
    (Butene-1)-ethylene copolymer -
        Condition E
    Ethylene-propylene copolymer elastomer -
        Condition L
    Ethylene-(butene-1) copolymer -
        Condition E
    Ethyl vinyl acetate -
        Condition E $$\text{Flow Rate Ratio} = \frac{\text{Melt flow at Condition F (10 times normal loading)}}{\text{Melt flow at Condition E (normal loading)}}$$

All percentages and parts given herein are by weight unless otherwise indicated.

Illustrative, non-limiting examples of the practice of the invention are set out below. Numerous other examples can readily be evolved in the light of the guiding principles and teachings contained herein. The examples given herein are intended to illustrate the invention and not in any sense to limit the manner in which the invention can be practiced.

The ethylene-(butene-1) copolymer shown in Table 1 were used in the examples:

Table 1

| Ethylene-(butene-1) Copolymer | Melt Flow dg/min. | Density gm/cc | Flow Rate Ratio |
|---|---|---|---|
| E-B A | 1.17 | 0.9175 | 80 |
| E-B B | 0.41 | 0.9180 | 88 |
| E-B C | 0.74 | 0.9180 | 71 |
| E-B D | 0.65 | 0.9243 | 83 |

EXAMPLES 1 to 4

Examples 1 to 4 were carried out to show the affect of the ethylene-(butene-1) copolymer in a multilayer film.

The first outer layer for the examples 1 to 4 was a blend of about 40% by weight of a commercially available polypropylene-ethylene copolymer (PP 9818, Diamond Shamrock) having a melt flow of about 12.0 decigrams per minute, having a density of about 0.899 gram per cubic centimeter, and containing about 4% by weight of ethylene, about 40% by weight of a commercially available (butene-1)-ethylene copolymer (Witron 1200, Witco Chemical Co.) having a melt flow of about 2.0 and having a density of about 0.91 gram per cubic centimeter, and about 20% by weight of a commercially available ethylene-propylene copolymer elastomer (Vistalon 702, Exxon Chemical Co.) having a melt flow at 190° C. (21,600 grams) of about 27 decigrams per minute, having a Mooney viscosity at 260° (ML 1+8 minutes) of about 23 centipoises, and containing about 70% by weight ethylene.

Each of the examples 1 to 4 had a core layer of a commercially available ionomer (Surlyn 1650, E. I. du Pont de Nemours & Co.) having a melt flow of about 1.4 decigrams per minute, and containing about 12% by weight ethylene-methacrylic acid copolymer with 13% conversion to a zinc salt.

The second outer layer for each of the examples 1 to 4 was an ethylene-(butene-1) copolymer as shown in Table 2.

The multilayer films for the examples 1 to 4 were produced by conventional methods by coextrusion of layers through a multilayer tubular die at 370° F. to form a primary tube having a diameter of about 1.45 inches and having a thickness of about 0.060 inch. The primary tube was water quenched and flattened with a first pair of pinch rollers at about 8 fpm and then continuously biaxially oriented by passing the primary tube through a cylindrical infra-red heater to heat it to slightly below its melting point and expanding the primary tube with air to from about 4 to about 6 times its diameter while stretching to a similar degree with a second pair of pinch rollers rotating at a rate of about 43 fpm.

Each of the films for the examples 1 to 3 had a thickness of about 2.5 mils with the first and second outer layers each being about 1.0 mil in thickness.

The film for the example 4 could not be made. This is believed to be due to the density of the E-B D.

The puncture test is carried out using a block of wood having a sharpened rod extending generally perpendicular to the surface of the cube. The rod can be made of wood or teflon. The film to be tested is wrapped around the pointed end of the rod and connected to the block so that the film is without slack but not taut. The block is then submerged in water at a temperature of about 98° C. The shrinking of the film results in pressure of the film against the point of the rod. The time for from submergence in the hot water and puncture is measured. A time of 6 seconds or greater is considered exceptional and it has been shown that there is a good correlation between the puncture test and field results.

Generally, the puncture test results relate to the shrinkage of the film as well as the time response of the film to the hot water. The thickness of the film is a factor as to the strength of the film and the time response of the film.

The films tested herein had shrinkage values and thicknesses about the same so that the comparison would be easier to interpret.

Table 2

| Example | Second Outer Layer | Puncture Resistance Test Seconds to Failure |
|---|---|---|
| 1 | E-B A | 1.8 |
| 2 | E-B B | 7.2 |
| 3 | E-B C | 6.6 |
| 4 | E-B D | no film could be made |

The film of the example 1 did not possess satisfactory puncture resistance for the proposed use for packaging poultry. This is due to the melt flow of the E-B A.

The films of the examples 2 and 3 had acceptable puncture resistance test results.

EXAMPLES 5 to 7

Examples 5 to 7 were carried out to compare the performance of the film of example 1 with different layer thickness ratios. Each of the films were made by the method described for the example 1 and each film had a thickness of about 2.25 mils. Table 3 shows the results of the puncture resistance test and the shrinkage for the films of the examples 5 to 7.

Table 3

| Example | Layer Thickness Ratio First/Core/Second | Puncture Resistance Test Sec. to Failure | Shrinkage at 90° C. MD/TD |
|---|---|---|---|
| 5 | 3/1/1 | 10+ | 18/28 |
| 6 | 2/1/2 | 6.6 | 17/27 |

Table 3-continued

| Example | Layer Thickness Ratio First/Core/Second | Puncture Resistance Test Sec. to Failure | Shrinkage at 90° C. MD/TD |
|---|---|---|---|
| 7 | 1/1/3 | 1.0 | 17/26 |

It is surprising that a second outer layer thickness of about 20% for the example 5 provided a very high puncture resistance as compared to the greater film thicknesses of the second outer layers of the examples 6 and 7. The shrinkage values at 90° C. were acceptable for the packaging of poultry.

EXAMPLE 8

Example 8 was carried out to determine the puncture resistance of a single layer film formed from the E-B-C. The puncture resistance was less than about 3 seconds.

EXAMPLES 9 AND 10

Examples 9 and 10 were carried out to show the performance of a film with a different core layer from the example 1 and with no core layer.

The film of the example 9 was the same as the film of the example 1 except that the core layer was a commercially available ethylene vinyl acetate having a melt flow of about 0.6 decigram per minute and containing about 9% by weight of vinyl acetate (Chemplex 1060, Chemplex Co.). The puncture resistance measured was about 8.1 seconds.

The film of the example 10 was the same as the film of the example 1 except that there was no core layer. The puncture resistance measured was about 8.5 seconds.

We wish it understood that we do not desire to be limited to the exact details shown and described, for obvious modifications will occur to a person skilled in the art.

Having described the invention, what we claim as new and desire to be secured by Letters Patent is as follows:

1. A heat-shrinkable multilayer film adapted for packaging of frozen poultry, comprising:
    a first outer layer comprising a blend of a propylene-ethylene copolymer having a high isotactic molecular structure, containing up to about 6% by weight ethylene, and having a melt flow of from about 1.5 to about 18 decigrams per minute; a (butene-1)-ethylene copolymer having a high isotactic molecular structure, containing from about 1% to about 10% by weight ethylene, and having a melt flow of from about 0.1 to about 5.0 decigrams per minute; and a thermoplastic elastomer selected from the group consisting of ethylene-propylene copolymers and ethylene propylene diene terpolymers, the ratio by weight of said propylene-ethylene copolymer to said (butene-1)-ethylene copolymer being from about 2:1 to about 1:2 and said thermoplastic elastomer being present from about 10% by weight to about 50% by weight; and
    a second outer layer comprising an ethylene-(butene-1) copolymer having a melt flow of from about 0.1 to about 1.0 decigram per minute and having a density of from about 0.916 to about 0.920 gram per cubic centimeter;
    said film being biaxially oriented.

2. The film of claim 1, wherein the ratio by weight of said propylene-ethylene copolymer to said (butene-1)-ethylene copolymer is about 2:1.

3. The film of claim 1, wherein the ratio by weight of said propylene-ethylene copolymer to said (butene-1)-ethylene copolymer is about 1:1.

4. The film of claim 1, wherein the ratio by weight of said propylene-ethylene copolymer to said (butene-1)-ethylene copolymer is about 1:2.

5. The film of claim 1, wherein said propylene-ethylene copolymer has a density of from about 0.89 to about 0.91 gram per cubic centimeter.

6. The film of claim 1, wherein said propylene-ethylene copolymer has a melt flow of from about 3.5 to about 12.0 decigrams per minute.

7. The film of claim 1, wherein said thermoplastic elastomer is present from about 20% to about 40% by weight.

8. The film of claim 1, wherein said thermoplastic elastomer comprises an ethylene-propylene copolymer elastomer.

9. The film of claim 8, wherein said ethylene-propylene copolymer elastomer comprises ethylene in the amount of at least 50% by weight.

10. The film of claim 9, wherein said ethylene-propylene copolymer elastomer comprises ethylene in the amount of about 70% by weight.

11. The film of claim 10, wherein said ethylene-propylene copolymer elastomer has a Mooney viscosity at 260° F. of from about 23 to about 50 centipoises.

12. The film of claim 1, wherein said thermoplastic elastomer comprises an ethylene-propylene diene modified terpolymer.

13. The film of claim 1, wherein the ratio by weight of said propylene-ethylene copolymer to said (butene-1)-ethylene copolymer is about 1:1 and said thermoplastic elastomer is present from about 20% to about 40% by weight.

14. The film of claim 1, further comprising a core layer comprising an extrudable adhesive capable of being biaxially oriented and heat shrinkable.

15. The film of claim 14, wherein said adhesive is selected from the group consisting of ionomers and ethylene vinyl acetates having a melt flow of from about 0.1 to about 1.0 decigrams per minute and having a vinyl acetate content of from about 9% to about 12% by weight.

16. The film of claim 1, wherein said ethylene(butene-1) copolymer has a melt flow of from about 0.3 to about 0.8 decigrams per minute.

17. The film of claim 1, wherein said ethylene(butene-1) copolymer has a flow rate ratio of from about 45 to about 100.

18. The film of claim 1, wherein said ethylene(butene-1) copolymer has a density of from about 0.918 to about 0.920 gram per cubic centimer.

19. The film of claim 1, wherein said ethylene(butene-1) copolymer is a linear polymer.

20. A bag fabricated from the film of claim 1.

21. The film as claimed in claim 14 consisting essentially of said first and second outer layers and said core layer.

22. The film of claim 21, wherein said first outer layer consists essentially of said blend and said outer layer consists essentially of said ethylene-(butene-1) copolymer.

* * * * *